May 17, 1966  J. ADAMSKI  3,251,625
CONVERTIBLE TOP HAVING A FORCE CONFINING BRACKET
Filed June 26, 1964  7 Sheets-Sheet 5

INVENTOR.
JOSEPH ADAMSKI
BY Stowell & Stowell
ATTORNEY

*INVENTOR.*
JOSEPH ADAMSKI
BY Stowell & Stowell
ATTORNEY

May 17, 1966  J. ADAMSKI  3,251,625
CONVERTIBLE TOP HAVING A FORCE CONFINING BRACKET
Filed June 26, 1964  7 Sheets-Sheet 7
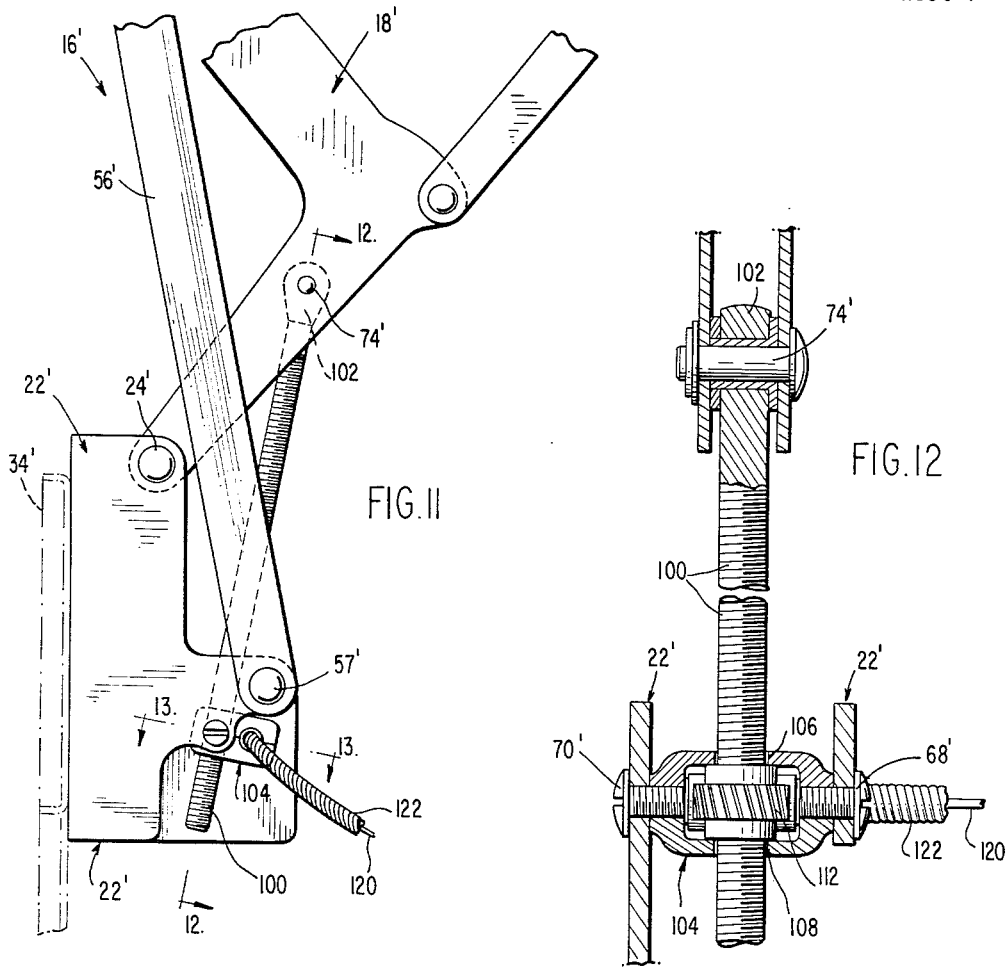
INVENTOR.
JOSEPH ADAMSKI
BY Stowell & Stowell
ATTORNEY United States Patent Office 3,251,625
Patented May 17, 1966

3,251,625
CONVERTIBLE TOP HAVING A FORCE
CONFINING BRACKET
Joseph Adamski, Brooklyn, Mich., assignor to Dura Corporation, Oak Park, Mich., a corporation of Michigan
Filed June 26, 1964, Ser. No. 378,274
5 Claims. (Cl. 296—117)

This is a continuation-in-part of application Serial No. 183,129 filed March 28, 1962 and since abandoned.

This invention relates to an improved actuating mechanism for automobile convertible tops.

It is an object of the present invention to provide a convertible top operator which is more compact and of cheaper construction than those of the prior art and which embodies actuator means mounted on the sides of the car body close to the points of application of effort to the top linkage.

More specifically, it is the object of the invention to provide a top operator wherein the actuator means for folding the top and for extending it to closed position where it covers the body passenger compartment, are trunnion mounted on support brackets on the sides of the body passenger compartment instead of being mounted on the floor of the passenger compartment as has been the case. This arrangement provides a cheaper and more compact operating mechanism, makes possible the use of relatively short stroke linear actuators, and permits mounting of the actuators in such manner that a more efficient application of power to the top linkage is possible.

A further object is to provide an improved actuating mechanism wherein the structures coact to provide an assembly whereby the closing and opening forces act substantially solely through a mounting bracket therefor, thereby eliminating forces which would tend to strip the mounting bracket from its attachment to a vehicle.

A further object is to provide an assembly of structures which permits attachment of a convertible top and the primary actuating members in an extremely simplified manner to an automotive vehicle.

A further object is to provide such a device wherein stop means are provided in the motor driven actuator to thereby relieve or eliminate reaction forces which might be transmitted through the windshield header during opening and closing of the convertible top.

These and other objects and advantages are provided in a convertible vehicle having a folding top structure including a plurality of operatively interconnected articulate members including a main operating generally angular lever, means connecting one end of the lever to other of the articulate members, means pivotally connecting the other end of the lever to a vehicle secured bracket, means for swinging said lever about the pivotal connection between the said other end thereof and the bracket to actuate the folding top structure, said swinging means including a motor driven actuator having a member pivotally mounted on the bracket for swinging motion about an axis parallel to the pivotal axis of the pivotal connection between the lever and the bracket and operatively connected to said lever intermediate the ends thereof.

Other objects and features of the invention will become apparent as the description proceeds, especially when taken in conjunction with the accompanying drawings, in which:

FIGS. 5, 6, 7 and 8 are detail sectional views on a still larger scale of various parts of the top operator, all taken as indicated by the arrows of FIG. 1;

FIG. 11 is an enlarged fragmentary view of a modified form of motor driven actuator for a convertible top constructed as illustrated in FIGS. 1 through 8;

FIG. 12 is an enlarged fragmentary partial sectional view taken on line 12—12 of FIG. 11; and FIG. 13 is a section substantially on line 13—13 of FIG. 11.

Figure 1:
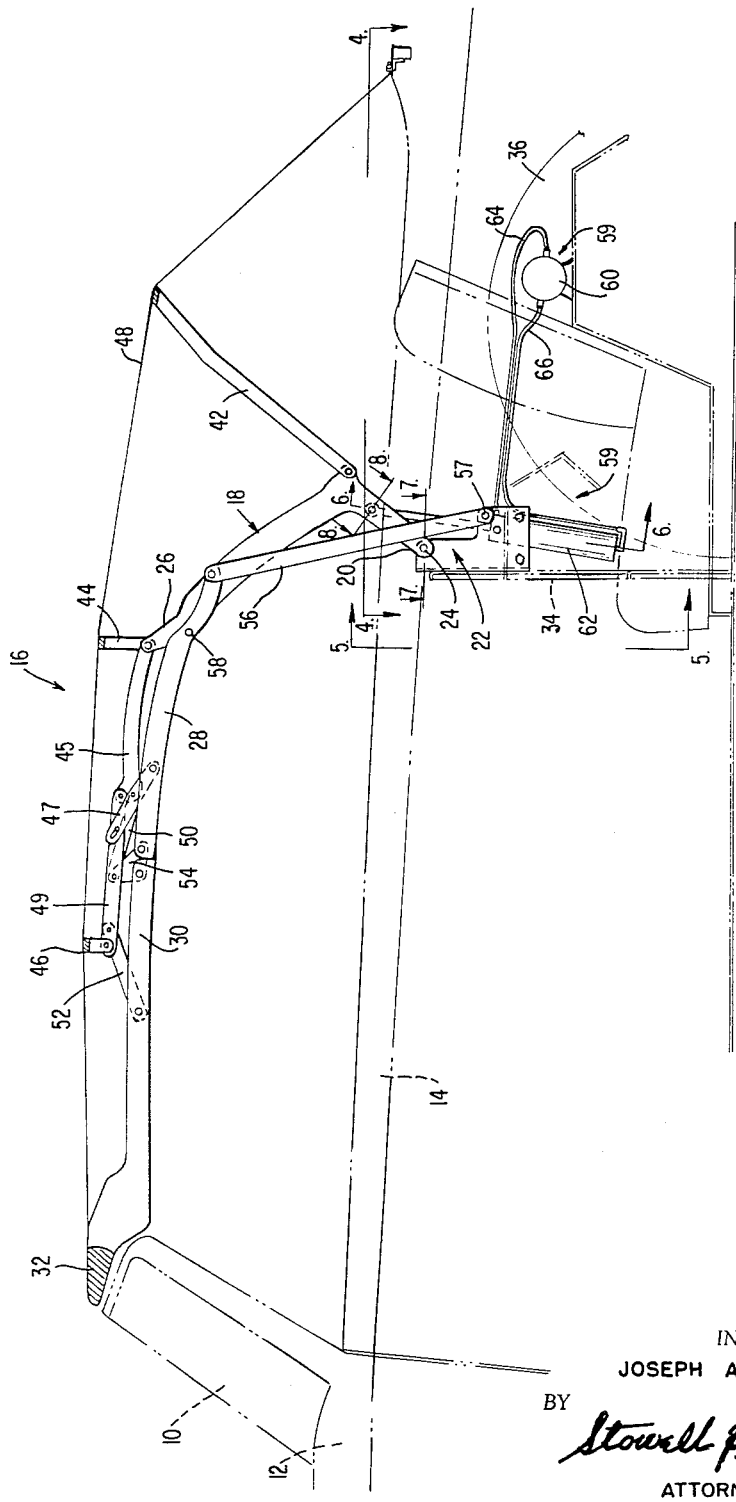
FIG. 1 is a vertical section through the folding top construction with the top in its fully extended position covering the passenger compartment of the vehicle.
Figure 2:
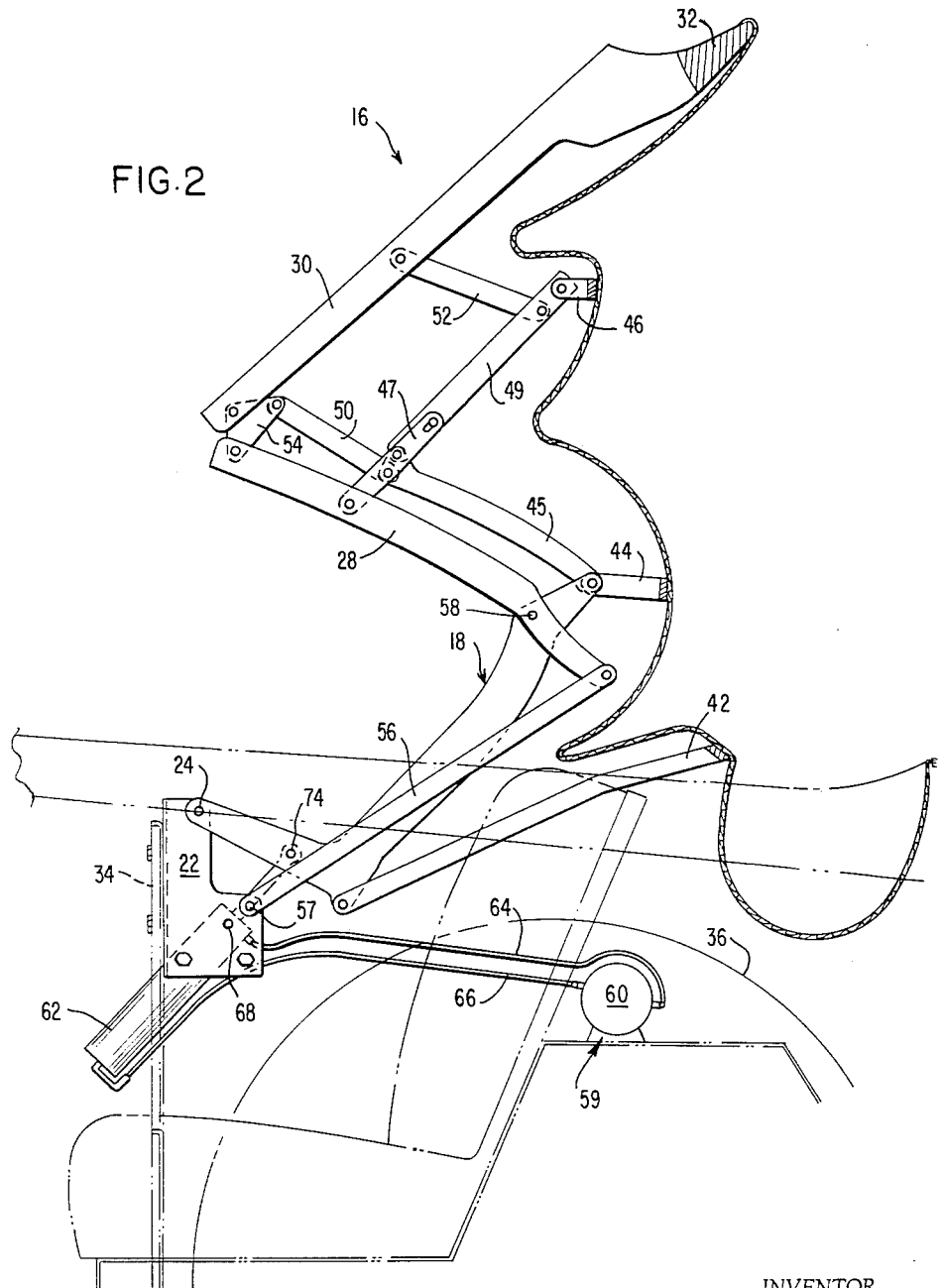
FIG. 2 is a similar view on a larger scale with the top in an intermediate position of movement.
Figure 3:
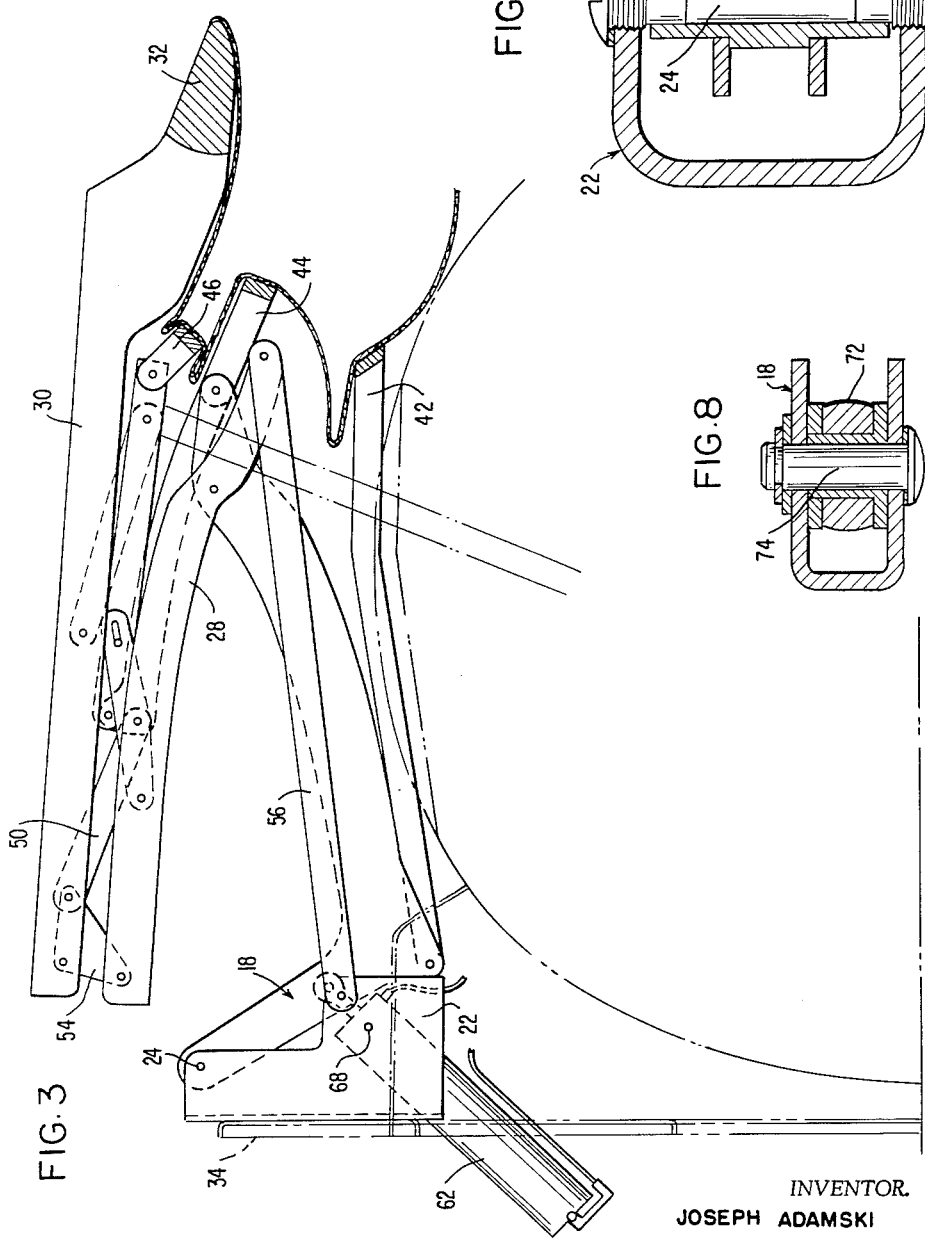
FIG. 3 is a view like that of FIG. 2 with the top in its folded position.

Referring now to the drawings, and particularly to FIGS. 1, 2 and 3, it will be seen that various portions of the vehicle body not essential to the mounting of the top are shown in broken lines such as, for example, the windshield 10, the cowl structure 12 and the door 14.

The folding top structure 16 includes a plurality of operatively interconnected articulate members including a rear side rail or main operating generally angular lever arm 18 positioned on each side of the top. Each of the angular levers 18 has its lower end 20 pivotally connected to a vehicle body mounted bracket 22 on a pivot pin 24. The other end 26 of each of the angular levers 18 is connected to its intermediate side rail 28, the forward ends of which are in turn pivotally connected to their respective front side rails 30 between the forward ends of which is a top header 32 adapted to seat on the windshield header when the top is in its extended position.

The support bracket 22 is preferably of U-shape (see FIGS. 4 and 7) and is securely attached by welding, bolting or the equivalent, to the illustrated body pillar 34. The pillar 34 is a structural part of the vehicle body and is rigidly secured by welding to the body floor, the outer body paneling and to the wheel housing 36. In certain convertible type bodies, the pillar terminates in an upward direction at a point below the body belt line and an inner quarter panel 38 (FIG. 5) is attached for the purpose of providing a well for the rear quarter window (not shown) which is housed in the body sidewall between the pillar and the outer body panel 40. In convertible bodies without pillars the support bracket 22 may be welded to the rear wheel housing or structural body reinforcing members and the like.

The top linkage also includes the usual bows 42, 44, 46, for supporting the cloth trim 48, links 45, 47, 49, 50 and 52, pivot plate 54, and balance link 56. The balance link 56 is pivotally connected at one end to the rear end of the intermediate top side rail 28, and at its other end to the bracket 22 at 57. As may be seen from the various figures, pivot 58 between the main angular lever 18 and the intermediate rail 28 is displaced from the ends of the respective side rails such that leverage is provided for operating the articulated top linkage in response to swinging of the main lever 18 on its mounting pivot 24, the reaction of the linkage being taken by the balance link 56. Swinging of the main lever 18 rearwardly from its FIG. 1 position will effect folding of the rails through interaction of the links as illustrated in FIGS. 2 and 3. Similarly, swinging of the main lever 18 upwardly and forwardly will cause the top linkage to unfold from its FIG. 3 position and pass through various intermediate positions, such as that shown in FIG. 2, to fully extended position as shown in FIG. 1. Means not shown is provided for clamping the top header 32 to the windshield header for retaining the top in position.

For a more detailed description of the top and its operation, reference is made to the copending application of Joseph Adamski, Serial No. 10,731, filed February 24, 1960, now Patent No. 3,036,859. The main lever arm 18 and, in turn, the entire top assembly, are actuated by motor driven actuator means generally designated 59. In FIGS. 1 through 8 an electro-hydraulic top actuator is illustrated. This actuator 59 comprises an electric motor driven power unit 60 and a pair of cylinders 62 interconnected by hoses 64, 66. The power unit 60 is preferably mounted on the raised floor portion of the body directly in back of the rear seat back, but may be mounted in any convenient place.

The motor of the power unit 60 is of the reversible electric type and a pump is drivingly connected to the motor for drive in either direction of rotation; the power unit also includes suitable valving and a fluid reservoir not shown in the drawings. The reservoir provides fluid to compensate for leakage and for the difference in volume of fluid displaced during movement of the cylinder pistons caused by the presence of the piston rods. Such power units are well known in the art, one example being shown in McLeod Patent No. 2,640,429, issued June 2, 1953.

Figure 4:
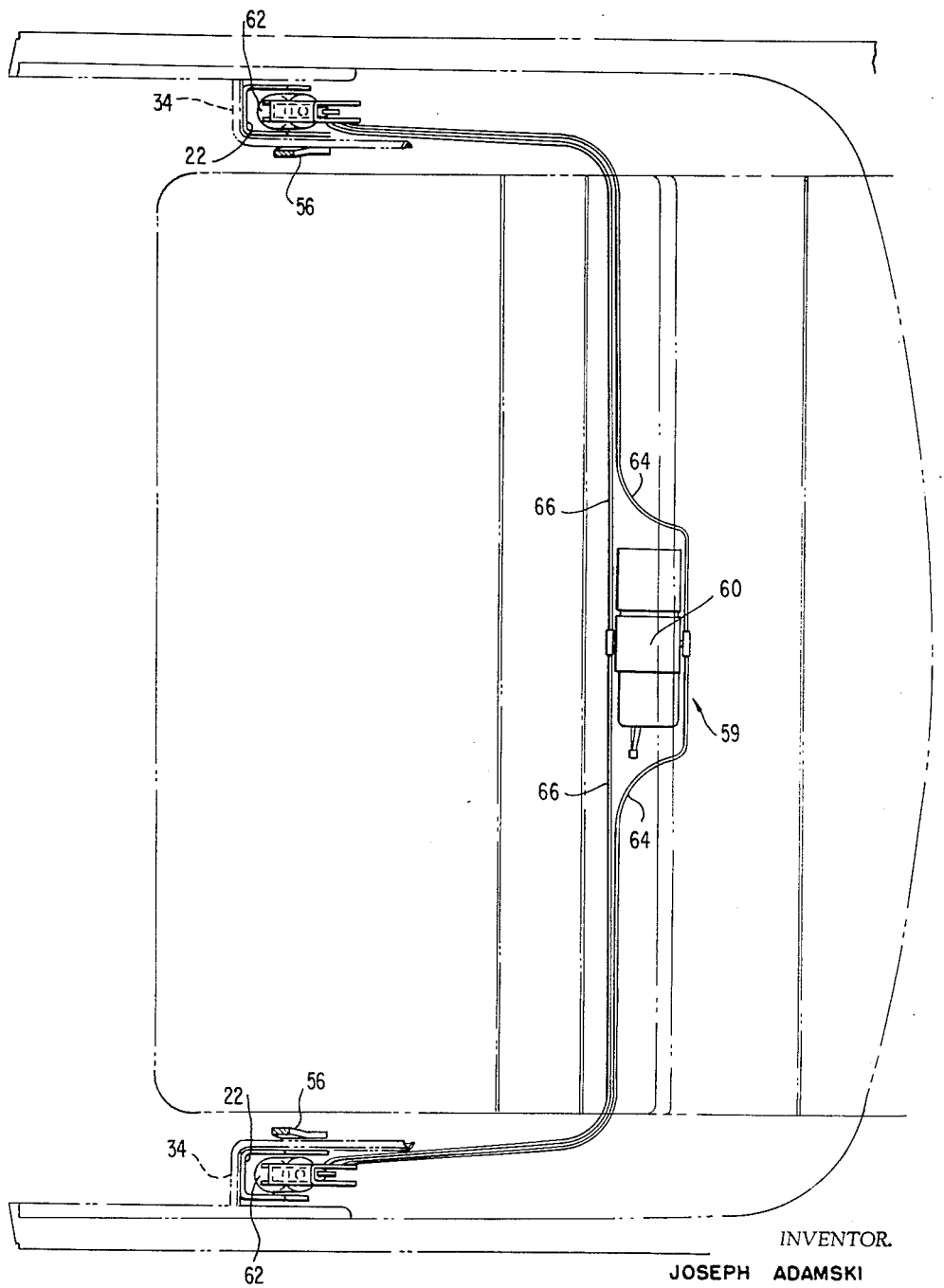
FIG. 4 is a sectional plan view taken as indicated by the arrows 4—4 of FIG. 1.
Figure 5:
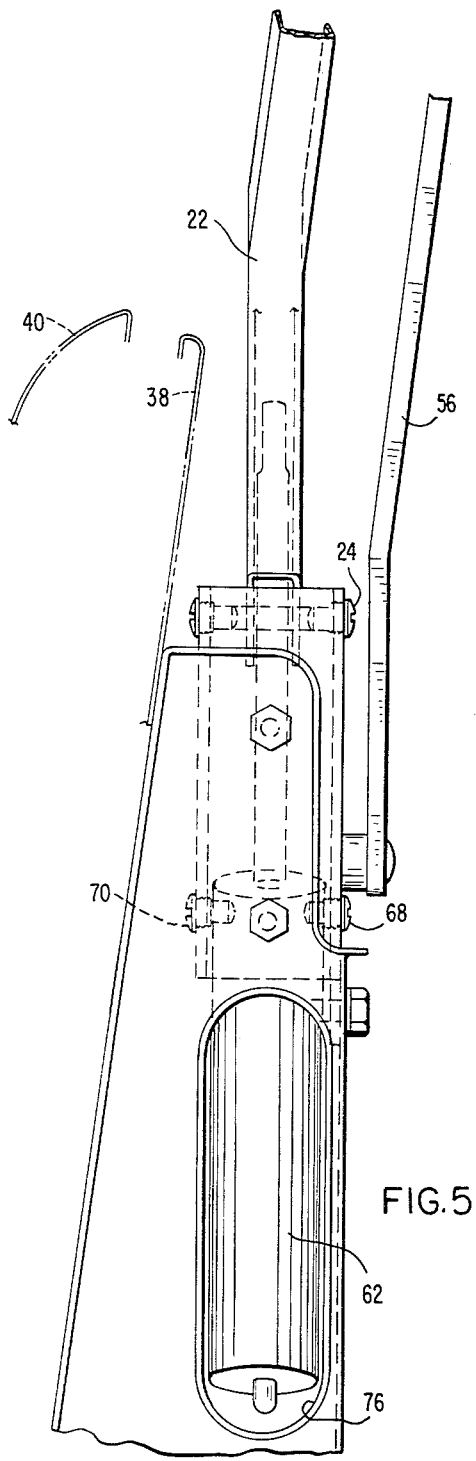

As may be seen more clearly in FIG. 4, the power unit 60 is disposed centrally of the body in the top well portion thereof, this location being convenient and providing relatively short lengths of hose for connection of the pump to the actuating cylinders 62.

An important feature of the invention resides in the mounting of the cylinders 62. As can be seen from the drawings, these cylinders are trunnion mounted on the brackets 22 by means of trunnion pins 68, 70, the axis of the trunnion being disposed adjacent the rod end of the cylinder in each case whereby the cylinders are pivotally mounted for swinging motion about axes parallel to the pivot axes of the pivotal connections 24 between the levers 18 and the brackets 22. A connecting rod 72 carried by the cylinder piston 73 is pivotally connected at 74 to the lever 18 at a point intermediate the pivot point 24 of the lever on the bracket 26 and the other end of the lever.

By mounting each cylinder to swing about an axis adjacent its top end rather than about an axis at the bottom end of the cylinder 62 as has been the practice in the prior art, application of power to the lever arm 18 is more direct as the lever swings in its arc of movement, and thus use of a cylinder or other linear motor means of much shorter stroke is possible.

As may be seen from the description, assuming that the top is in its FIG. 1 extended position, folding of the top may be accomplished by manipulating the switch (not shown) which controls the motor of the power unit 60 to cause said motor to drive the pump of the power unit in such direction that fluid is withdrawn from the lower ends of the cylinders 62 and is pumped into the upper ends thereof. It is, of course, assumed that the header 32 has been released from the windshield header.

Movement of the piston rods 72 downwardly will cause clockwise swinging of the lever arms 18 about their pivots 24 and through reaction of the balance links 56 and associated linkage, movement of the top assembly from FIG. 1 position to FIG. 3 position will be accomplished. As the top assembly swings rearwardly of the body, the cylinders 62 will swing on their trunnion axes to accommodate the top movement. The pillars 34 are each provided with a cut-out aperture 76 to accommodate the swing of its connected cylinder 62.

Erection of the top to its FIG. 1 extended position is accomplished by causing reverse rotation of the motor of the power unit 60.

From the foregoing description, it will be particularly noted that described structures coact to provide a convertible top operating mechanism whereby the closing and opening forces act substantially solely through the bracket 22, either placing the bracket under compressive or elongating forces, thereby eliminating forces which would tend to strip the bracket from its attachment to the vehicle. Such an arrangement of parts permits the mounting of the actuating mechanism for the convertible top on elements of lighter construction and particularly it permits moving the mounting means remote from the main structural elements of the vehicle.

Figure 6:
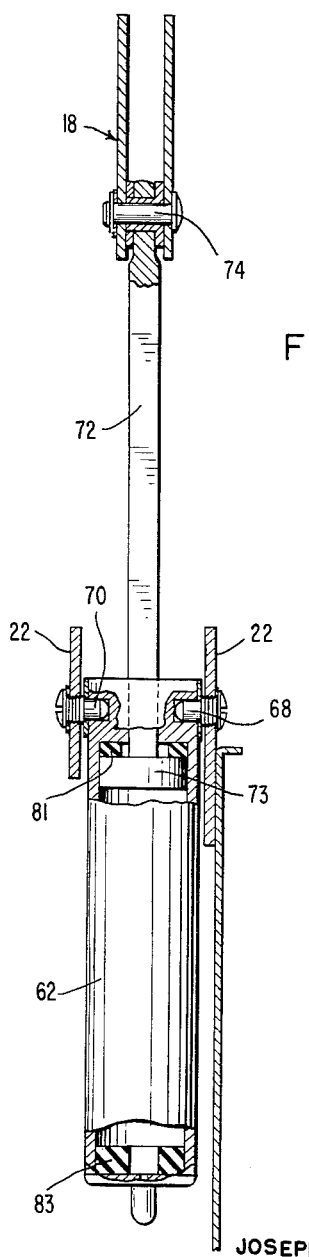

As illustrated in FIG. 6 of the drawings, a rubber bumper 81 may be mounted within the cylinder 62 between the upper head thereof and the most extended position of the piston 73. The rubber bumper 81 is of a size and so positioned that the piston 73 engages the bumper just prior to engagement of the header 32 with the windshield header. Thus, not only can the entire bundle of force moments, including the reaction forces, be confined to the bracket 22, the reaction forces which might otherwise be exerted on the vehicle body through the header 32 and its connection to the windshield when the top is in the erected position may be rendered ineffective by contact of the piston with the rubber bumper just prior to actual contact of the header 22 with the windshield header. This arrangement eliminates the possibility of exerting damaging forces on the windshield header. A similar resilient stop member 83 may be mounted adjacent the lower end of each of the cylinders to prevent unnecessary forces from being applied to the folded top.

Figure 9:
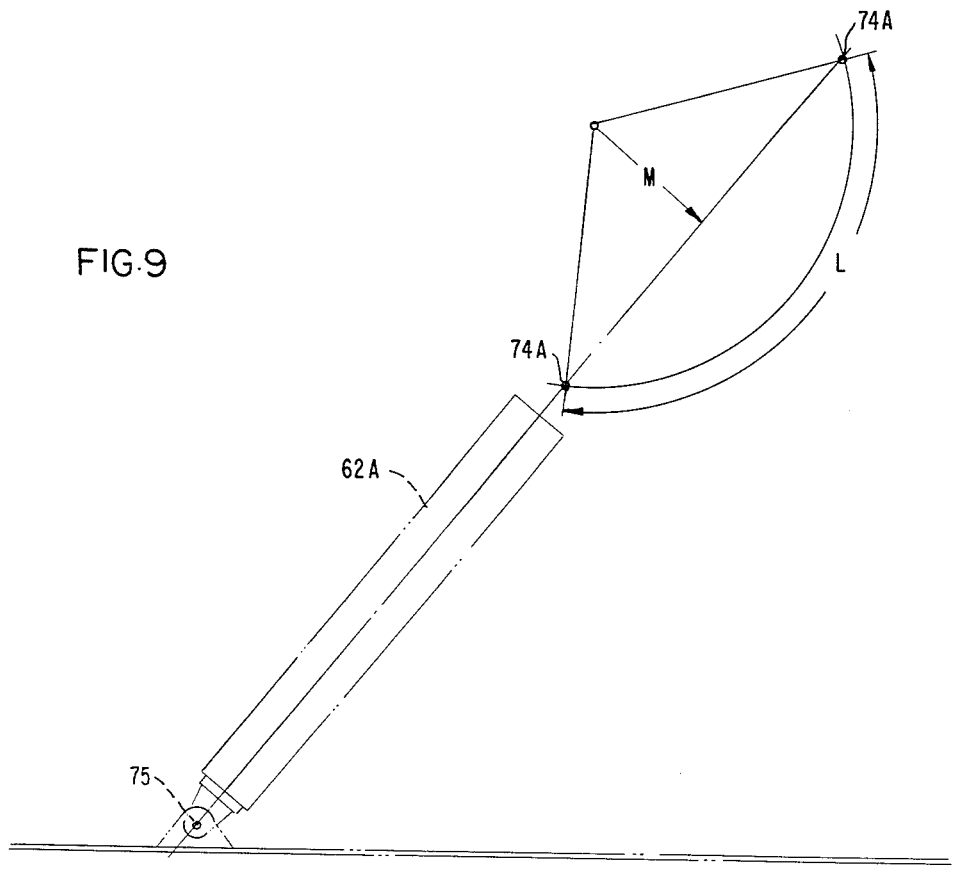
FIG. 9 is a schematic force diagram of a top operator that is in standard use and typical of the prior art.
Figure 10:
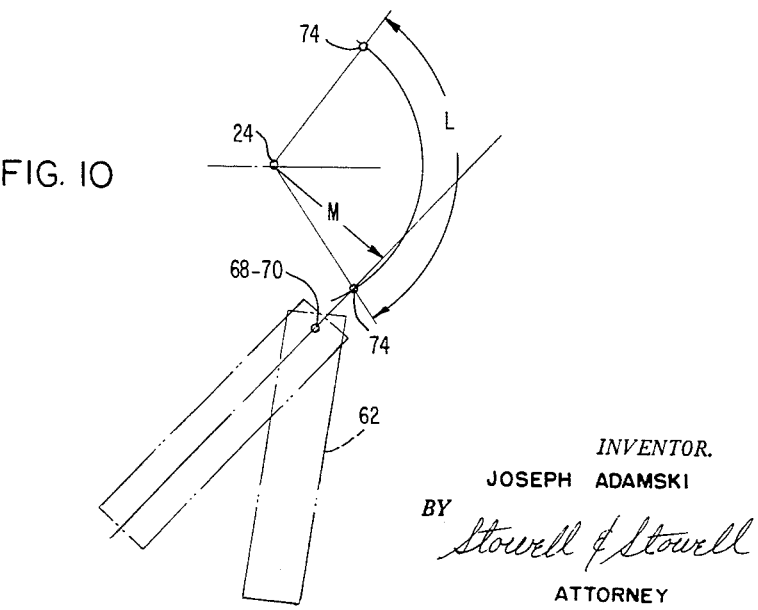
FIG. 10 is a similar schematic force diagram of a top operator of the type described and claimed herein.

Reference to FIGS. 9 and 10, which are force diagrams of the top operator described herein and the top operator currently in use in the automotive industry, will show the superiority of the trunnion mounted type over that of the prior art.

FIG. 9 is a schematic representation of a conventional floor mounted cylinder 62–A pivotally mounted on the floor of the vehicle body at 75 for swinging movement to accommodate swinging of the cylinder as the piston rod moves the main lever through the arc L for raising the top to extended position. Because of body space limitations, the floor mounted cylinder 62–A must be mounted in such position that the angle of attack of the piston rod at the point of application 74–A on the lever to achieve the necessary force moment M is relatively unfavorable.

The greatest force requirement in the operation of a power actuated vehicle top occurs at the beginning of the stroke when the top linkage is being raised out of the body well from the folded position. In the conventional construction such as that shown in FIG. 9, it is therefore necessary to provide hydraulic pressures far in excess of those necessary for moving the top linkage through its arc of movement after it has once been moved out of the well which constitutes only a few degrees of movement at the beginning of the stroke. The same is true during the operation of the top from its extended position to folded position—the greatest force being required to crowd the linkage and folded top trim material into the body well.

FIG. 9 clearly shows that as the main lever is swung out of the well, the angle of attack becomes more favorable and remains so during almost all of the arc L, but at a time when it is not required, and in some instances is undesirable because of tendency for the top header to be engaged with the windshield header with excessive force.

FIG. 10 shows that the same force movement M may be achieved and the same swing arc L provided by means of a trunnion mounted cylinder 62 mounted for swinging on an axis 68–70 near its rod end and close to the point of application of force 74. Because the cylinder 62 is able to swing freely about the axis 68–70 as the pivot 74 swings along the arc L, it will be seen that the required force movement M is available for breaking out the linkage from the well and for moving the linkage through most of the swing arc L. While the angle of attack is not quite as favorable at the beginning of the top folding operation, the force requirement under this condition is not too great.

It is obvious that the arrangement of FIG. 10, in addition to being more efficient, effects economies in size of cylinder, volume of hydraulic fluid and length of hose. Furthermore, by placing the reaction pivot 57 of the balance link 56 on the bracket 22 which also carries the pivot 24 of main lever 18 and the trunnion pins 68, 70, all stresses incident to raising and lowering the top structure are concentrated on the bracket which, as stated above, is carried by the pillar 34 or another structural part of the body as hereinbefore described. In installations like that shown schematically in FIG. 9, it is necessary to reinforce the body floor in the vicinity of the pivot 75, and breaking of rivets and pivot pins, particularly at the connection 74–A, is not uncommon because of the high pressures required in the cylinder 62–A due to its unfavorable angle of attack at certain portions of the stroke.

It will thus be seen that the invention makes possible an extremely compact power actuator for convertible tops by mounting the power cylinders for swinging on axes disposed adjacent the upper ends of the cylinders instead of their lower ends.

As hereinbefore discussed, the form of the motor driven actuator for springing the main lever 18 of the roof or top assembly about its pivotal connection to the bracket 22 is not critical and need not comprise a hydraulic piston and cylinder unit. Referring now to FIGS. 11, 12 and 13, a modified form of motor driven actuator is illustrated and in these figures identical parts are given primed reference characters corresponding to those employed in describing FIGS. 1 through 8 and only one side assembly will be described hereinafter.

In FIGS. 11, 12 and 13, 22' generally designates a U-shaped bracket which is rigidly secured to a generally vertical positioned pillar 34' or other structural member attached to the main body portion of the automotive vehicle. The main angular lever arm 18' and the balance link 56' of the top forming linkage structures generally designated 16 in FIG. 1 of the drawings are pivotally mounted to the bracket by pivot pins 24' and 57', respectively.

The motor driven actuator means for the main lever arm 18' includes an elongated threaded shaft 100 having one end 102 pivotally connected on pivot pin 74' to the lever arm 18' in the same manner as illustrated with reference to the first form of the invention.

A housing member generally designated 104 is pivotally mounted to the generally U-shaped bracket 22' on pivot pins 68' and 70' as more clearly illustrated in FIGS. 12 and 13 of the drawings. The housing 104 has a pair of aligned openings 106 and 108 through which the threaded shaft 100 passes. Mounted within a cavity 110 within the housing 104 is a beveled gear 112 having an internally threaded surface, the threads of which mate with the threads on the shaft 100 whereby upon rotation of the gear 112, the shaft 100 is urged rectilinearly through the housing 104. Means for rotating the gear 112 comprises a worm gear 114 having bearing surfaces 116 and 118 which engage complementary bearing surfaces in the housing 104. The extended end of a flexible shaft 120 is secured to the worm gear 114 and where desired the flexible shaft 120 may be provided with a flexible protective sheath 122. The other end of the flexible shaft 120 is connected to a suitable reversible motor of the rotary electric or pressure fluid types not specifically shown in the drawings whereby upon actuation of the motor shaft 120 is rotated which, in turn, drives worm gear 114 having engagement with the beveled gear 112. Rotation of the beveled gear 112 causes rectilinear movement of the threaded shaft 100 and, in turn, pivotal swinging motion of the main lever 18'.

As described with reference to the form of the invention shown in FIGS. 1 through 8, resilient stop means may be secured adjacent opposite ends of the threaded shaft 100 whereby motor torque applied to the flexible shaft 100 will not result in undesirable force application to the header member of the windshield of the vehicle during opening of the roof or undesirable forces to the linkages when the roof is in the folded position.

From the foregoing description, it will be seen that the present invention fully accomplishes the aims and object hereinbefore set forth and that while two forms of motor driven actuators have been illustrated for swinging the main lever 22 or 22' about the pivotal connection between the lever arm and its main bracket, other forms of trunnion mounted linear motion producing means may be employed without departing from the scope of the present invention.

I claim:

1. In a convertible vehicle a folding top structure including a plurality of operatively interconnected articulate members movable from a folded rearward position to an extended top supporting position, said articulate members including a main operating generally angular lever, means connecting one end of the lever to another of said articulate members, means for swinging said main operating lever for extending and folding said top structure, said swinging means including a motor driven actuator, means for confining the reaction forces of the motor driven actuator and the reaction forces of said main lever, said reaction force confining means comprising a rigid bracket member, means securing said rigid bracket member to a weldment of a convertible vehicle and means pivotally attaching the other end of the main lever and said motor driven actuator to said rigid bracket, said rigid bracket having a rigidity such that the reaction forces of said actuator and the main lever are entirely confined therein.

2. The invention defined in claim 1 including a balance link, means operatively connecting one end of the balance link to said interconnected articulate members and means pivotally mounting the other end of said balance link to said rigid bracket on an axis generally parallel to and spaced from the connection of the main lever to said rigid bracket.

3. In a convertible vehicle a folding top structure including a plurality of operatively interconnected articulate members movable from a folded rearward position to an extended top supporting position, said articulate members including a main operating generally angular lever, means pivotally connecting one end of the lever to another of said articulate members, means for swinging said main operating lever for extending and folding said top structure, said swinging means including a motor driven actuator, means for confining the reaction forces of the motor driven actuator and the reaction forces of said main lever, said reaction force confining means comprising a rigid bracket member, means securing said rigid bracket member to a weldment of a convertible vehicle and means pivotally mounting the other end of the main lever and said motor driven actuator to said rigid bracket on spaced pivotal axes, said rigid bracket having a rigidity such that the reaction forces of said actuator and the main lever are entirely confined therein.

4. The invention defined in claim 3 wherein said motor driven actuator comrpises a pressure fluid cylinder pivotally mounted on the said rigid bracket for swinging movement about an axis spaced from the pivotal axis of the pivotal connection between the main lever and the rigid bracket, a piston and piston rod operatively mounted in said cylinder, and means pivotally connecting the extended end of the piston rod and the main lever intermediate the ends of the main lever.

5. The invention defined in claim 3 including a balance link, means operatively connecting one end of the balance link to said interconnected articulate members and means pivotally mounting the other end of said balance link to said rigid bracket on an axis generally parallel to and spaced from the pivotal connections between the main lever and the cylinder and the said rigid bracket.

References Cited by the Examiner

UNITED STATES PATENTS

| | | | |
|---|---|---|---|
| 2,404,577 | 7/1946 | Jackson | 296—117 |
| 2,434,332 | 1/1948 | Oliver et al. | 296—117 |
| 2,596,355 | 5/1952 | Ackermans | 296—117 X |
| 2,617,972 | 11/1952 | Nutter | 296—107 X |
| 2,704,226 | 3/1955 | Orr | 296—117 |
| 2,959,447 | 11/1960 | Stebbins et al. | 254—93 X |
| 3,007,315 | 11/1961 | Marshall | 254—93 |
| 3,036,859 | 5/1962 | Adamski | 296—116 |

FOREIGN PATENTS 59,416   1/1942   Denmark.

BENJAMIN HERSH, *Primary Examiner.*

A. HARRY LEVY, *Examiner.*

C. C. PARSONS, *Assistant Examiner.*